UNITED STATES PATENT OFFICE.

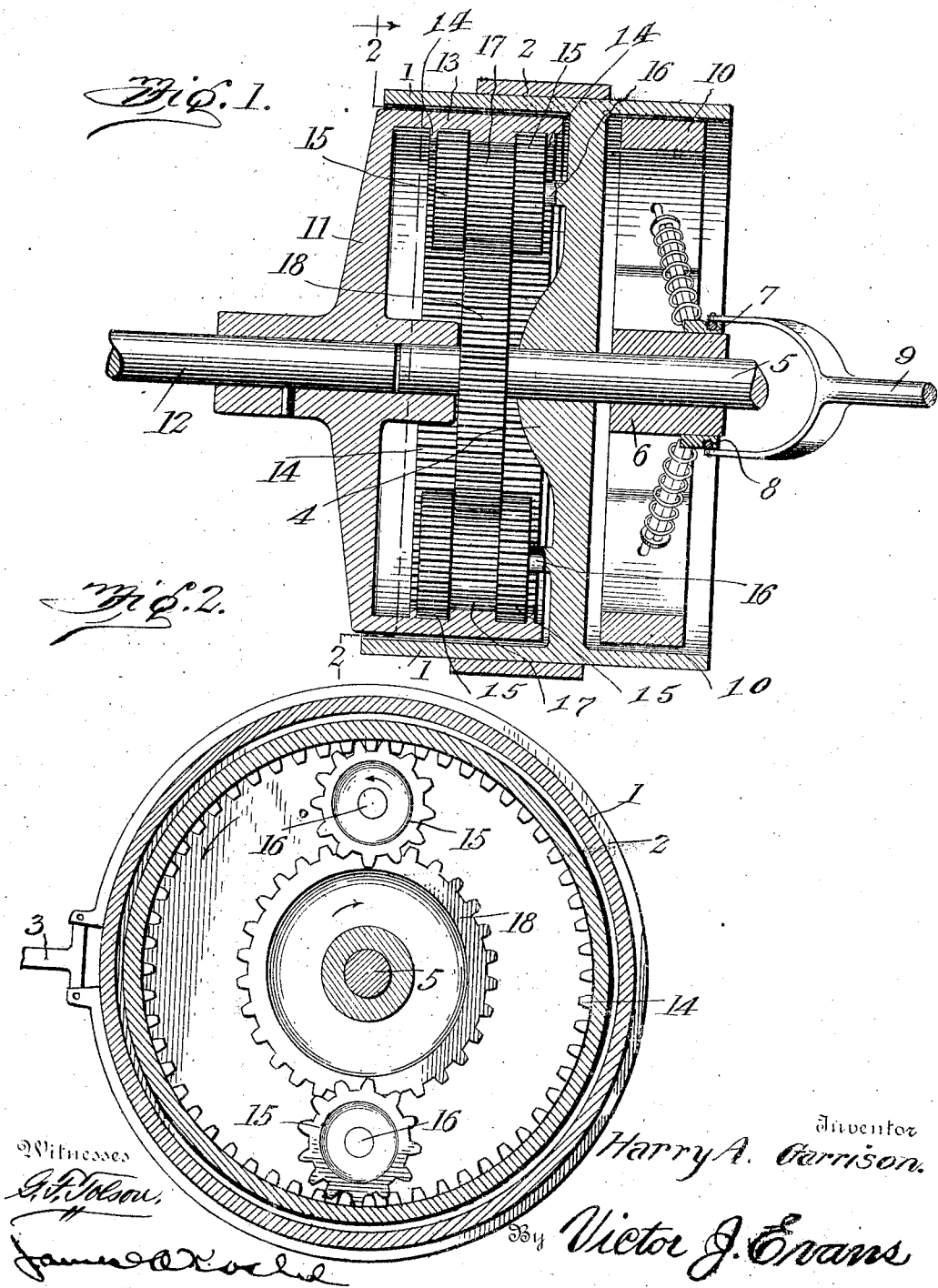

HARRY A. GARRISON, OF FAYETTE, IOWA.

REVERSE-GEARING.

976,731.  Specification of Letters Patent.  Patented Nov. 22, 1910.

Application filed January 11, 1910. Serial No. 537,488.

*To all whom it may concern:*

Be it known that I, HARRY A. GARRISON, a citizen of the United States of America, residing at Fayette, in the county of Fayette and State of Iowa, have invented new and useful Improvements in Reverse-Gearing, of which the following is a specification.

This invention relates to reverse gearing, the object of the invention being to provide a novel and reliable form of gearing of this character for driven vehicles such as automobiles, motor boats or power driven machines, in which the shaft sections are maintained in perfect alinement with each other, and the power from one shaft to the other applied in a more direct manner thereby eliminating torsion on the bearing.

In the drawing, forming a portion of this specification and in which like numerals of reference indicate similar parts in the several views:—Figure 1 is a detail sectional elevation of my improved reverse gearing. Fig. 2 is a section taken on the line 2—2 of Fig. 1.

The reverse gear consists of a cylindrical outer rim 1 which is provided with a contracting clutch or friction band 2 which is operated by a lever 3 shown in Fig. 2 of the drawing whereby the band may be moved into frictional engagement around the rim to hold the rim stationary. The rim carries a hub 4 which is loosely mounted on the drive shaft 5. Mounted fast on the said shaft is a hub 6 which supports a sliding collar 7, this collar is provided with an annular groove for the reception of a ring 8 through which is pivotally connected the fork end of a shifting lever 9. The collar 7 supports an expansible clutch which preferably consists of suitable brake shoes 10 which are adapted to be moved into engagement with the walls of the rim 1 upon operation of the shifting lever 9.

A drum 11 is fixed on the driven shaft 12 and as shown, the annular wall 13 of the said drum extends into the rim 1 at one side of the hub 4. The wall 13 of the said drum is toothed interiorly as shown at 14 to mesh with spaced gear wheels 15 upon shafts 16 which extend from the hub 4 upon the rim 1. The spaced gear wheels 15 are separated from each other by similar but smaller gear wheels 17 which are also operatively mounted upon the shafts 16. The gear wheels 17 mesh with a master gear wheel 18 upon the drive shaft 5. The hub of the drum 11 is extended into the rim 1 to form a bearing for one end of the shaft 5. When the expanding clutch is moved through the action of the shifting lever 9 to engage the inner surface of the rim 1 the entire mechanism will revolve as a unit, the driven shaft being caused to revolve in the same direction with the drive shaft 5, but when this clutch is moved out of engagement with the rim 1 the gears 15 and 17 become fixed parts and the master gear turning in a forward direction causes, as will be understood, a reverse motion of the inner drum and hence a reverse motion of the driven shaft.

I claim:—

1. In reverse gearing, a drive shaft, a rim having a hub portion loosely mounted on the shaft, a master gear on the shaft, a driven shaft, a fixed drum supported by the driven shaft and having its rim extended to lie immediately beneath the said first named rim, the rim of the said drum having a plurality of annular toothed surfaces, shafts extending from said hub, gear wheels supported by the said last named shafts and meshing with the toothed surfaces of the said drum and with said master gear, a brake band for the first named rim, and a sliding clutch member mounted on the drive shaft and operable to engage the said first named rim to cause the same to rotate in a direction with the drive shaft.

2. Reverse gearing comprising a drive shaft, a master gear wheel mounted fast on said shaft, a driven shaft, a drum fast on said driven shaft and provided with an annular toothed surface, a rim surrounding the drum and supported by the said drive shaft, pairs of spaced gears supported by the rim and meshing with the said toothed surface of the drum, gear wheels supported by the rim and disposed between the said spaced gear wheels and meshing with the said master gear wheel, a sliding clutch collar on the engine shaft, clutch shoes adapted to be moved thereby into frictional engagement with the rim for holding the latter fast to the shaft, and a brake adapted for engagement with the rim to hold it against rotation with the shaft when the clutch is moved to its released position.

3. In reverse gearing, a drive shaft, a rim having a hub portion loosely mounted on the said shaft a brake band surrounding the rim, a sliding clutch on the drive shaft for engaging the rim to cause the same to rotate with the shaft, a driven shaft having a rim portion extending into the first named rim, and having also a bearing portion receiving one end of said drive shaft, a master gear secured to the drive shaft, and pinions on the hub of the first named rim geared to the said second named rim, and with said master gear.

In testimony whereof I affix my signature in presence of two witnesses.

HARRY A. GARRISON.

Witnesses:
 O. W. STEVENSON,
 WM. FRAYER.